United States Patent [19]
Matyas, Jr. et al.

[11] Patent Number: 5,987,124
[45] Date of Patent: Nov. 16, 1999

[54] METHOD AND APPARATUS FOR ENCRYPTING LONG BLOCKS USING A SHORT-BLOCK ENCRYPTION PROCEDURE

[75] Inventors: Stephen Michael Matyas, Jr.; Donald Byron Johnson, both of Manassas, Va.

[73] Assignee: International Business Machines Corporation, Armonk, N.Y.

[21] Appl. No.: 08/847,902

[22] Filed: Apr. 28, 1997

Related U.S. Application Data

[63] Continuation-in-part of application No. 08/603,771, Feb. 20, 1996, Pat. No. 5,870,470.

[51] Int. Cl.$^6$ .............................. H04L 9/00; H04K 1/00
[52] U.S. Cl. .................................. 380/4; 380/23; 380/44; 380/28
[58] Field of Search .............................. 380/3, 4, 21, 23, 380/28, 30, 44

[56] References Cited

U.S. PATENT DOCUMENTS

| | | | |
|---|---|---|---|
| 5,146,500 | 9/1992 | Maurer | 380/30 |
| 5,159,632 | 10/1992 | Crandall | 380/28 |
| 5,271,061 | 12/1993 | Crandall | 380/28 |
| 5,272,755 | 12/1993 | Miyaji et al. | 380/30 |
| 5,351,297 | 9/1994 | Miyaji et al. | 380/28 |
| 5,425,103 | 6/1995 | Shaw | 380/21 |
| 5,442,707 | 8/1995 | Miyaji et al. | 380/30 |
| 5,619,576 | 4/1997 | Shaw | 380/28 |
| 5,675,653 | 10/1997 | Nelson, Jr. | 380/28 |

FOREIGN PATENT DOCUMENTS 9415423  7/1994  WIPO .

OTHER PUBLICATIONS

Johnson, DB et al., "Hybrid Key Distribution Scheme Giving Key Record Recovery", vol. 37, No. 02A, Feb. 1994, pp. 5–16.

Koblitz, N, "Elliptic Curve Cryptosystems", Mathematics of Computation, vol. 48, No. 177, Jan. 1987, pp. 203–209.

Rivest, RL et al., "A Method for Obtaining Digital Signatures and Public–Key Cryptosystems", Communications of the ACM, vol. 21, No. 2, Feb. 1978, pp. 120–126.

Miller, VS, "Use of Elliptic Curves in Cryptography", Advances in Cryptology—Crypto '85, Lecture Notes in Computer Science, 218 (1986), Springer–Verlag, pp. 417–426.

Bellare, M et al., "Optimal Asymmetric Encryption", Advances in Cryptology—EUROCRYPT '94, Workshop on the Theory and Application of Cryptographic Techniques, Perugia, Italy, May 9–12, 1994 Proceedings, pp. 92–111.

Kaliski, Jr., BS, "A Standard Definition for Optimal Asymmetric Encryption Padding", RSA Laboratories, Redwood City, CA, Feb. 6, 1996—Second Draft, pp. 1–15.

*Primary Examiner*—Harshad Patel
*Assistant Examiner*—Robin Clark
*Attorney, Agent, or Firm*—William A. Kinnaman Jr.

[57] ABSTRACT

A system for encrypting a plaintext block using a block encryption algorithm having a block size smaller than that of the plaintext block. The plaintext block is transformed into a masked plaintext block using an invertible transformation optionally dependent on additional data and defined such that each bit of the masked plaintext block depends on every bit of the original plaintext block. A subportion of the masked plaintext block is encrypted using the encryption algorithm to generate an encrypted portion of the masked plaintext block. A ciphertext block is generated from the thus encrypted portion of the masked plaintext block and the remaining portion of the masked plaintext block. The ciphertext block is transmitted to a data recipient, who reverses the procedure to recover the original plaintext block. Since the entire masked plaintext block is necessary to reconstruct the original plaintext block and since the encrypted portion cannot be derived from the remaining portion, the remaining portion of the masked plaintext block may be transmitted to the recipient in unencrypted form. Two, three or four masking rounds are performed, depending on the location of secret data that is infeasible to exhaust and the location of the portion of the masked block that is encrypted.

20 Claims, 5 Drawing Sheets

METHOD AND APPARATUS FOR ENCRYPTING LONG BLOCKS USING A SHORT-BLOCK ENCRYPTION PROCEDURE

CROSS-REFERENCE TO RELATED APPLICATION

This application is a continuation-in-part of the commonly owned copending application of D. B. Johnson and S. M. Matyas, Jr., Ser. No. 08/603,771, filed Feb. 20, 1996, now U.S. Pat. No. 5,870,470 entitled "METHOD AND APPARATUS FOR ENCRYPTING LONG BLOCKS USING A SHORT-BLOCK ENCRYPTION PROCEDURE", incorporated herein by reference.

BACKGROUND OF THE INVENTION

1. Field of the Invention

This invention relates to a block encryption system and more particularly to a method and apparatus for encrypting a long plaintext block using an encryption procedure intended for relatively short blocks.

2. Description of the Related Art

Encryption schemes fall into two general categories: symmetric encryption systems and asymmetric encryption systems. In symmetric encryption systems, such as those conforming to the Data Encryption Standard (DES), the same key is used by the originator to encrypt data (i.e., convert plaintext to ciphertext) and by the recipient to decrypt the same data (i.e., convert ciphertext back to plaintext). Symmetric encryption schemes can often be implemented very efficiently, but suffer the disadvantage of requiring the prior exchange of encryption keys over a secure communications channel.

Asymmetric encryption systems, or public key encryption systems as they are usually called, use one key to encrypt data while using another key to decrypt the same data. In a public key encryption system, an intended recipient of data generates a key pair consisting of an encryption key, which is made public, and a corresponding decryption key, which is kept private and not shared with others. The keys are generated in such a manner that the private key cannot be derived from knowledge of the corresponding public key; hence, only the intended recipient having the private key can decrypt a ciphertext message generated using the public key. An important advantage public key encryption systems have over symmetric systems is that they do not require the exchange of secret key information; two parties can establish a secure two-way communication by exchanging public keys that they have generated. For this reason, asymmetric encryption systems are often used for the secret key exchange required in symmetric encryption systems.

Perhaps the most well-known public key encryption system is the RSA encryption system, named after its originators and described in R. L. Rivest et al., "A Method for Obtaining Digital Signatures and Public-Key Cryptosystems", *Communications of the ACM*, vol. 21, no. 2, pp. 120–126 (1978). RSA encryption systems typically have encryption blocks on the order of 512 bits and can be computationally quite intensive. Recently, however, so-called elliptic curve systems have been described in such references as N. Koblitz, "Elliptic Curve Cryptosystems", *Mathematics of Computation*, vol. 48, no. 177, pp. 203–209 (January 1987), and A. Menezes, *Elliptic Curve Public Key Cryptosystems* (1993). Like the RSA encryption system, elliptic curve systems are public key systems with public encryption keys and private decryption keys. Elliptic curve systems typically have relatively short key and encryption block sizes, on the order of 160 bits for each, but have a cryptographic strength that is comparable to that of longer-block RSA encryption systems. Elliptic curve systems thus represent an attractive combination of cryptographic strength and computational efficiency.

Since elliptic curve encryption systems are public key systems, one use of such systems might be to distribute keys. Thus, user A might use a public elliptic curve key to encrypt a symmetric key (e.g., a DES key) for distribution to user B. But a problem arises, since the symmetric key is normally contained in a key block (e.g., a 512-bit block) which is much longer than the elliptic curve encryption block, which, as noted above, may be on the order of only 160 bits. Although the key block can be divided into multiple encryption blocks of sufficiently small size, the additional encryption operations required for the individual encryption blocks vitiate to some extent the natural advantages of elliptic curve systems in terms of their computational efficiency. What is needed is a method of key encryption that can be used with an elliptic curve algorithm which will permit a large key block to be encrypted with a secret elliptic curve key of much shorter length.

The above-identified copending application Ser. No. 08/603,771 discloses a system for encrypting a plaintext block (such as a key block) using a block encryption algorithm (such as an elliptic curve algorithm) having a block size smaller than that of the plaintext block. As disclosed in that application, the plaintext block is transformed into a masked plaintext block using an invertible transformation optionally dependent on additional data outside the plaintext block. The additional data may comprise control information, a control vector or other information available to the recipient and not requiring encryption. The transformation is defined such that (1) the original plaintext block is recoverable from the masked key block and optional additional information and (2) each bit of the masked plaintext block depends on every bit of the original plaintext block. A subportion of the masked plaintext block is encrypted using the encryption algorithm to generate an encrypted portion of the masked plaintext block. A ciphertext block is generated from the thus encrypted portion of the masked plaintext block and the remaining portion of the masked plaintext block. The ciphertext block is transmitted to a recipient, who reverses the procedure to recover the original plaintext block.

Either the plaintext block or the additional data on which the transformation is optionally dependent is uniquely modified for each encryption of a plaintext block, using an incrementing counter, time stamp, random number or other mechanism to thwart certain cryptanalytic attacks.

Since the entire masked plaintext block is necessary to reconstruct the original plaintext block and since the encrypted portion cannot be derived from the remaining portion, the remaining portion of the masked plaintext block may be transmitted to the recipient in unencrypted form. The discloses system thus permits a long key block to be encrypted with a short encryption key. In an exemplary embodiment, an elliptic curve algorithm having a block size on the order of 160 bits is used to encrypt a 512-bit block containing a symmetric encryption key.

The copending application teaches the use of three or more rounds in a masking process prior to asymmetric encryption. However, the copending application provides no explicit guidance on determining how to achieve security with a minimum number of rounds in various scenarios.

Thus, it has been suggested that the system described in the copending application that the system may expose secret information, depending on the location of that information in the input block.

It has been suggested that this exposure may be avoided by adding a masking round, for a total of four masking rounds, or by locating the secret information in the part of the input block that is first used to mask the other part. However, both of these alternatives have disadvantages. Adding another masking round increases the computational expense, while locating the secret information in a particular part of the input block may not always be possible in a particular situation.

Thus, identification of the exact number of rounds needed to achieve security in varying scenarios is important. If fewer masking rounds are performed than are required, then the system may be insecure. On the other hand, if more masking rounds are performed than are required, then the performance of the system may be unnecessarily degraded.

SUMMARY OF THE INVENTION

The present invention is an enhancement of the invention described in copending application Ser. No. 08/603,771. The importance of the number of masking rounds, as well as the location of the secret information relative to the part of the input block that is first used to mask the other part, have been previously recognized. The present invention, on the other hand, recognizes the significance of a previously unrecognized factor, namely, the location of the portion of the masked block that is encrypted using an asymmetric algorithm.

More particularly, in accordance with the present invention, the part of the masked input block that is encrypted is the masked part that was last used as an input to produce the last masking value. For example, in a three-round procedure, if part A masks part B to produce part B', part B' masks A to produce part A', and part A' masks part B' to produce part B'', then A' is the part that should be encrypted. On the other hand, if the roles of parts A and B are reversed, then B' is the part that should be encrypted. This results in a minimum number of required masking rounds.

In general, two, three or four rounds are needed as a minimum, depending on (1) the location of secret data that is infeasible to exhaust and (2) the location of the portion of the masked block that is encrypted using an asymmetric or other algorithm. Three rounds is the best overall practical choice, for the reasons stated below.

DESCRIPTION OF THE PREFERRED EMBODIMENTS

Figure 1:
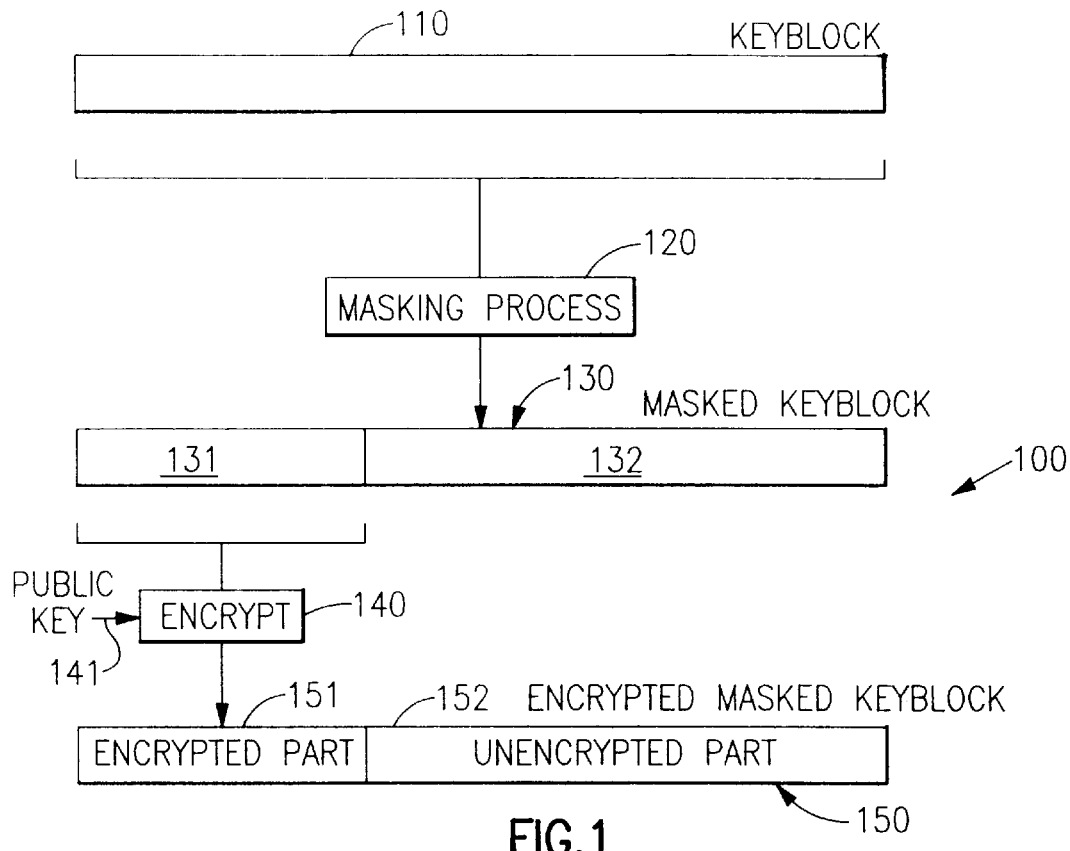
FIG. 1 is a schematic block diagram of the encryption procedure of the present invention.

FIG. 1 illustrates the general encryption procedure 100 of the present invention. Depending on the particular implementation, the functional blocks depicted in FIG. 1 and elsewhere may represent hardware elements, software code, or some combination of the two. As is usual, by "software code" is meant a program of instructions residing on a machine-readable program storage device (such as a magnetic or optical disk) that are executable by a machine (such as a server or a client workstation) to perform the described method steps. The machine and program storage devices of such a software implementation are entirely conventional and are hence not shown.

Encryption procedure 100 has as its input a long plaintext block such as the key block 110 shown. In general, key block (or input block) 110 may consist of any desired data, such as a symmetric encryption key. However, key block 110 should contain a secret value (e.g., a secret DES key or a secret random number) of sufficient length to prevent exhaustion and to prevent an adversary from inverting the masking procedure to be described. For the sake of discussion, it will be assumed that the secret value has enough independent bits to prevent exhaustion attacks to find its value, e.g., 128 bits. The present invention does not contemplate any particular number of bits, though, for the secret value.

The key block 110 may also contain certain fixed bits that may be required by the encryption process (e.g., setting a high order bit to zero) or required by the parsing algorithm (e.g., use of a delimiter byte). However, the key block 110 should preferably also contain other fixed or predictable bits used for non-malleability; these bits can be used to verify that the key block has been properly recovered.

Figure 5:
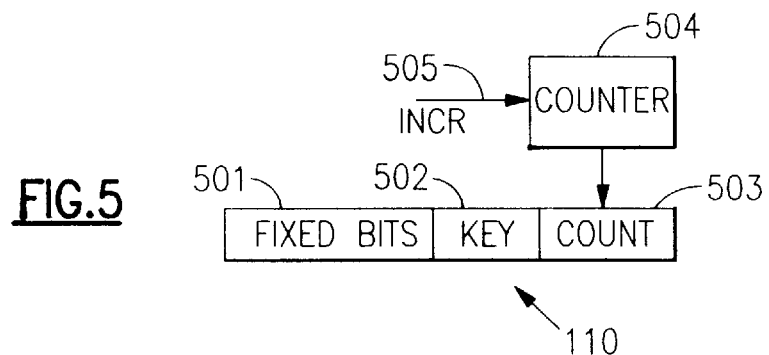
FIG. 5 is a schematic block diagram of a possible format of the key block.

FIG. 5 shows a possible format for key block 110. Key block 110 contains a first field 501 with fixed information to verify the recovery process, a second field 502 containing the symmetric encryption key or other secret information being conveyed to the recipient, and an optional third field 503 containing a count from a counter 504 that is incremented (505) for each encryption of a plaintext block.

Count field 503 ensures that the key block 110 is unique for each encryption of a plaintext block. Although a randomly generated number could be used for a similar purpose, using a count deterministically avoids identical key blocks 110, whereas a random number only provides a probability of avoiding identical key blocks. As an alternative to having a count in the key block 110 itself, a count may also be inserted into an additional data field, outside the key block, on which the masking transformation is optionally dependent, as described below.

Although count field 503 is shown to the right in FIG. 5, it may be preferable to transpose the key field 502 and the count field 503 in order to give the input block 110 certain desirable properties, as described below.

Referring again to FIG. 1, in encryption procedure 100 key block 110 is first "masked", or transformed into a masked key block 130 of the same size using a masking procedure 120, the details of which are described below.

A subportion 131 of the masked key block 130 is then encrypted, using a encryption procedure 140 having an encryption key 141, to generate an encrypted portion 151 of a ciphertext block 150. Preferably, encryption procedure 140 is a public key procedure, such as an elliptic curve procedure having a key (and encryption block) size on the order of 160 bits. The particulars of the elliptic curve procedure used form no part of the present invention, but are described in the references cited above. While the elliptic curve procedure is highly preferred because of its high cryptographic strength relative to its block size, in general any other public key procedure or even a private key procedure such as DES may be used instead for encryption procedure 140.

The remaining portion 152 of the ciphertext block may simply be taken from the corresponding portion 132 of the masked plaintext block 130, without encrypting it. Alternatively, all or part of the remaining portion 132 of the masked key block 130 may be encrypted as one or more blocks or subportions, using one or more keys and one or more encryption algorithms. The same data may also be multiply encrypted along an encryption pipeline, again using one or more keys and one or more encryption algorithms.

Figure 2:
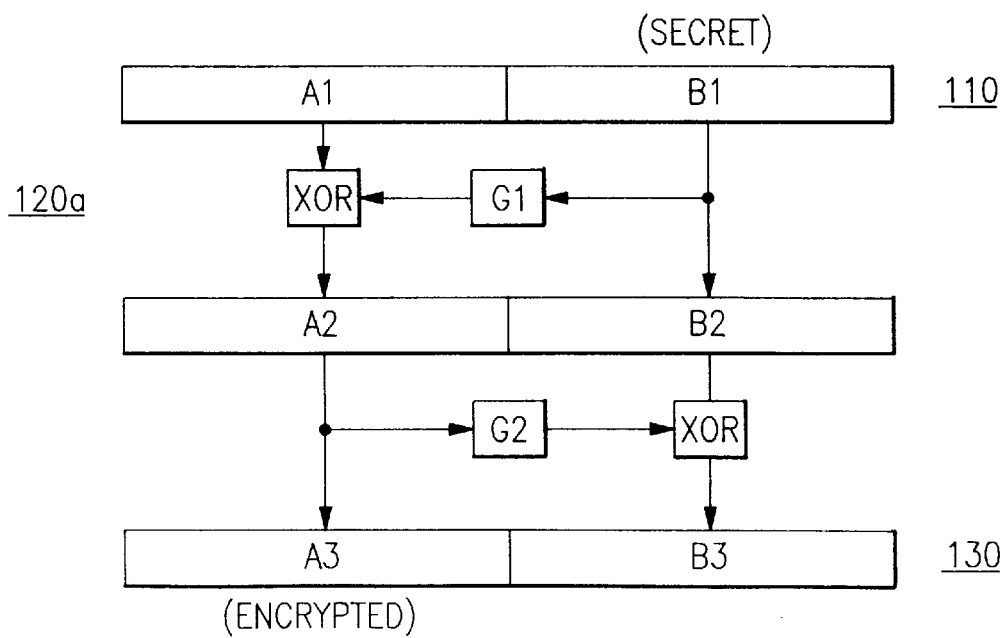
FIG. 2 is a schematic block diagram of a masking procedure used in the encryption procedure of FIG. 1 in which two masking rounds are performed.
Figure 3:
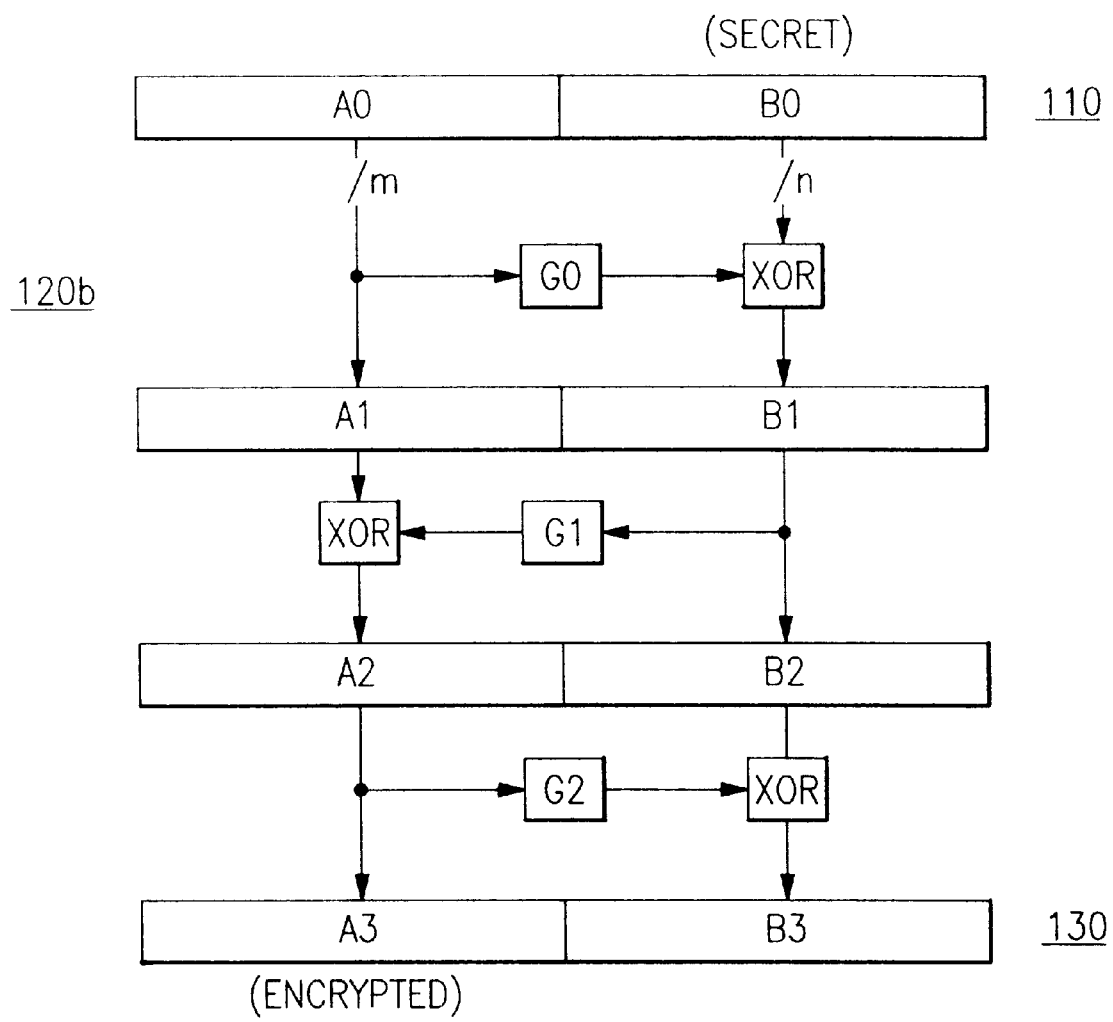
FIG. 3 is a schematic block diagram of a masking procedure used in the encryption procedure of FIG. 1 in which three masking rounds are performed.
Figure 4:
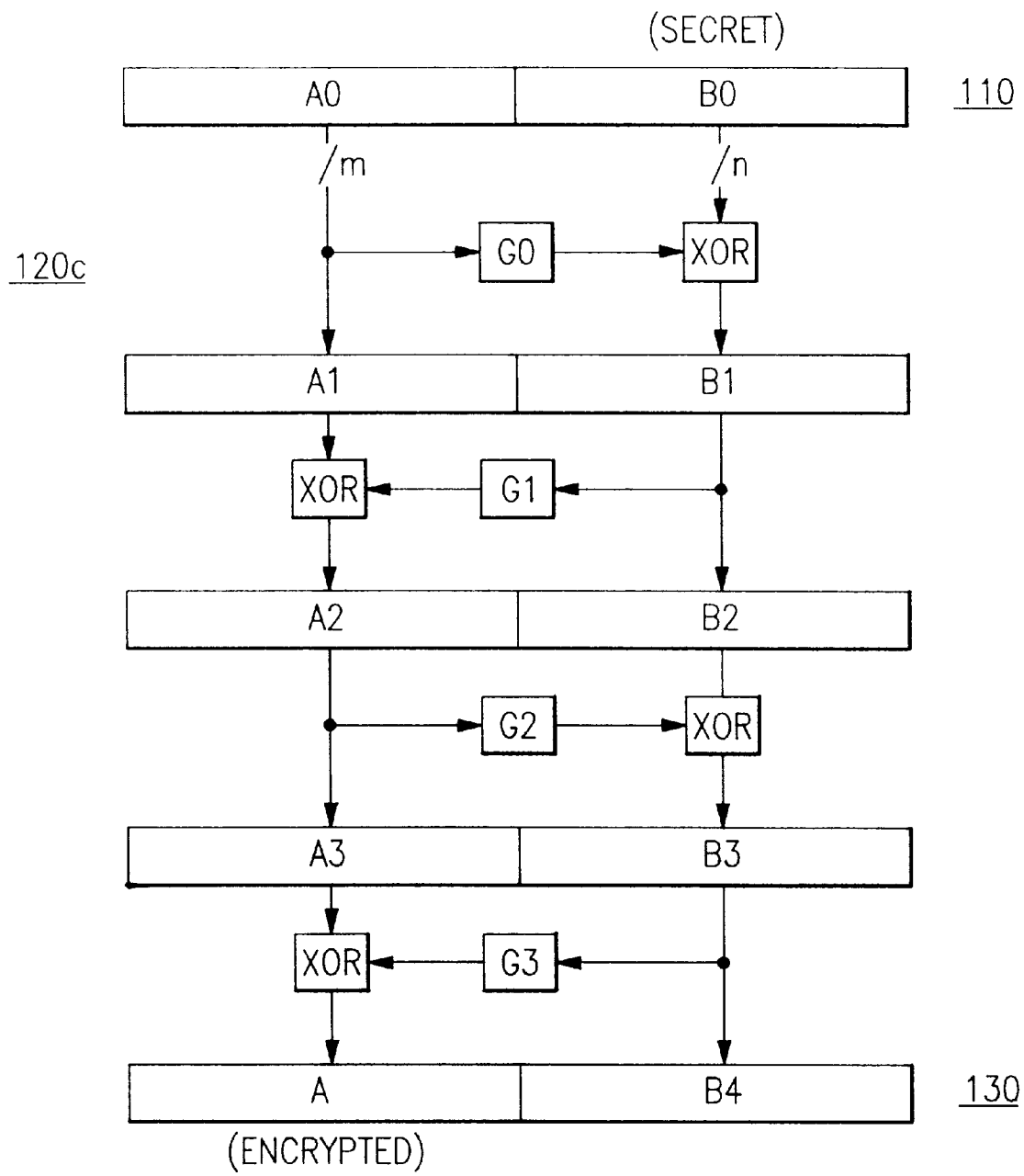
FIG. 4 is a schematic block diagram of a masking procedure used in the encryption procedure shown in FIG. 1 in which four masking rounds are performed.

FIGS. 2–4 show various alternative implementations of the masking procedure 120. Masking procedure 120 is an invertible transformation that preferably has the following cryptographic properties:

1. Each bit in the masked key block 130 is a function of each and every bit in the key block 110 (i.e., there is strong intersymbol independence).
2. No bit in the key block 110 can be determined unless every bit in the masked key block 130 is known or available (excepting the case where the adversary is able to exhaust on the unknown bits of the masked key block).

The masked key block 130 produced by a masking procedure 120 having these properties can be protected by encrypting any subportion of it, as long as the key is long enough to deter an exhaustion-type attack.

The masking procedure first divides the key block 110 into a first part (part A) and a second part (part B). Although part A is shown to the left of part B in the figures, any other scheme for assigning bits to the two parts may be used as well; the order and location of the bits is not important. Parts A and B may be of equal length or of different lengths. There may be security advantages, however, to having parts A and B of equal or near equal length.

It is assumed that at least one of parts A and B contains a secret value, such as a secret key or a secret random number. However, the secret value may also be divided with a portion in part A and a portion in part B.

In general, masking procedure 120 comprises the following steps:

1. Masking a first part (A or B) with a second part (B or A) to generate a once masked first part.
2. Masking the second part with the once masked first part to generate a once masked second part.
3. Optionally performing one or more additional masking iterations in which the masked part on the previous iteration becomes the masking part on the current iteration and vice versa.

Three iterations of masking are needed to make each bit in the masked key block 130 a function of each bit in the (unmasked) key block 110. Three iterations of masking, appropriately performed, should also be sufficient to make each bit in the masked key block 130 dependent on each bit in the original key block 110. This achieves complete intersymbol dependence.

The number of iterations required to achieve security depends on (1) the location of the secret data in the input block 110; and (2) the location of the encrypted portion 131 of the masked input block 130.

Let the left part of the input block 110 to be processed be called part A and the right part be called part B. It is assumed that the input block 110 has sufficient secret data such that exhaustion is infeasible; otherwise, as the public key 141 of the asymmetric algorithm 140 is known, anyone can encrypt values using the public key 141 until a value matching the ciphertext 150 is found. Also, for simplicity of description, initially assume that the first step in the processing is to use part B to mask part A. By symmetry, part A can play the role of part B and vice versa.

If part B has sufficient secret data such that exhaustion is infeasible and part A contains the location of the masked block that will be encrypted by the asymmetric algorithm, then the method is secure if a minimum of two rounds are done.

FIG. 2 shows a masking procedure 120a in which two masking rounds are used. In the masking procedure 120a shown in FIG. 2, input block 110 is partitioned into an m-bit first part A1 and an n-bit second part B1, where m and n may be the same or different. In the first masking round, part B1 is passed through a first generator function G1 to generate an m-bit mask value that is XORed with A1 to generate a m-bit masked part A2, while part B1 is used without modification as part B2. In the second round, masked part A2 is passed through a second function G2 to generate an n-bit mask value that is XORed with B2 to generate a n-bit masked part B3, while part A2 is used without modification as part A3. Parts A3 and B3 make up the output block 130 of the two-round masking procedure 120a.

In the example shown in FIG. 2: (1) the original part B is assumed to contain sufficient secret data such that exhaustion is infeasible; and (2) the final part A (i.e., the masked part used as an input to produce the last masking value) is assumed to contain the location of the masked block 130 that is encrypted by the asymmetric algorithm 140. The method is secure when two or more rounds are done if both of these conditions apply.

In the example shown in FIG. 2, it is not necessary that the entire part A of the masked block 130 be encrypted using the (asymmetric) encryption procedure 140. It is only necessary to encrypt a large enough piece to prevent exhaustion attacks from succeeding.

Ensuring that the original part B contains sufficient secret data such that exhaustion is infeasible can be accomplished in the exemplary embodiment if the formatted block 110 ensures that the fields are sorted by placing the non-secret data on the left and the secret data on the right. If multiple values are non-secret, then they should be sorted within the non-secret section by placing the least variable on the left and the most variable on the right. If multiple values are secret, then they should be sorted within the secret section by placing the least variable on the left and the most variable on the right. The dividing line between part A and part B should be chosen so that part B contains enough secret bits so that the secret bits cannot be exhausted; for example, 128 secret bits cannot be exhausted using current technology.

More specifically, for an input block 110 containing a hash value, a symmetric key, and a random number, the hash value should be on the left, followed by the symmetric key followed by the random number. On the other hand, for an input block 110 containing a hash value, a symmetric key and a counter, the hash value should be on the left, followed by the counter, followed by the symmetric key. If there is any constant data, it should be placed to the left of the hash value.

If it is not known that part B has sufficient secret data such that exhaustion is infeasible, then "backing up" and using part A as input to mask part B to produce "partially masked part B" will ensure that "partially masked part B" contains sufficient secret variability to ensure that exhaustion is infeasible. This is because it is assumed that part A and part B together have sufficient secret data that exhaustion is infeasible when both parts are considered together. Note that part A is required to be the part that will (after masking) be encrypted using the asymmetric algorithm. Note also that it takes three rounds of masking to achieve intersymbol dependance.

FIG. 3 shows a three-round masking procedure 120b that is similar to the two-round procedure 120a shown in FIG. 2 except that an initial masking round has been added. In this three-round procedure 120b, the input block 110 is again divided into an m-bit and n-bit part, which are here denominated A0 and B0. In the initial masking round, part A0 is passed through a generator function G0 to generate an n-bit mask value that is XORed with part B0 to generate an n-bit masked part B1, while part A0 is used without modification as part A1. Parts A1 and B1 are then handled as in the two-round procedure 120a shown in FIG. 2 to generate a masked input block 130.

In the example shown in FIG. 3, as in the previous example: (1) the original part B is assumed to contain sufficient secret data such that exhaustion is infeasible; and (2) the final part A (i.e., the masked part used as an input to produce the last masking value) contains the location of the masked block 130 that is encrypted by the asymmetric algorithm 140. However, when three or more masking rounds are performed, it is not necessary that both of these conditions be satisfied; the method is secure if either condition is satisfied.

In the example shown in FIG. 3, as in FIG. 2, it is not necessary that the entire part A of the masked block 130 be encrypted using the (asymmetric) encryption procedure 140. It is only necessary to encrypt a large enough piece to prevent exhaustion attacks from succeeding.

Four rounds are needed if (1) it is not known if either part has sufficient secret data considered by themselves so that exhaustion is infeasible and (2a) it is not known which masked part contains the portion of the masked block that will be encrypted using the asymmetric algorithm or (2b) it is known which masked part that contains the portion of the masked block will be encrypted using the asymmetric algorithm and it is known to be not the part that is used at input to produce the last mask value.

FIG. 4 shows a four-round masking procedure 120c that is similar to the three-round procedure 120b shown in FIG. 3 except that another masking round, this time a final round, has been added. In this four-round procedure 120c, parts A3 and B3 are generated as before. However, rather than stopping here, part B3 is passed through a third generator function G3 to generate an m-bit mask value that is XORed with A3 to generate a m-bit masked part A4, while part B3 is used without modification as part B4. Parts A4 and B4 make up the output block 130 of the four-round masking procedure 120c.

In the example shown in FIG. 4, as in the previous examples: (1) the original part B is assumed to contain sufficient secret data such that exhaustion is infeasible; and (2) the final part A contains the location of the masked block 130 that is encrypted by the asymmetric algorithm 140. However, when four or more masking rounds are performed, it is not necessary that either of these conditions be satisfied; the method is secure, no matter which part is encrypted.

These requirements can be summarized as follows:
1. Two rounds is the minimum needed.
2. If one does not know if one part has sufficient secret data so that exhaustion is infeasible and can start the masking process by using that part as input to produce the first mask, then one more round is needed.
3. If one does not know which masked part will be encrypted by the asymmetric algorithm, then one more round is needed.
4. The maximum number of rounds is four.

In terms of practical usage, three rounds appears very useful. As the masking operation and the asymmetric encryption operation need to be done together to ensure security, it will very often be the case that the part of the resulting masked block that is to be asymmetrically encrypted is known by that complete process. If one knows that the leftmost bits in the masked block are to be asymmetrically encrypted, then to achieve security in the masking process in only three rounds, one can use the (leftmost) part A as the initial input to the first masking routine. If one knows that the rightmost bits in the masked block are to be asymmetrically encrypted, then to achieve security in the masking process in only three rounds, one can use the (rightmost) part B as the initial input to the first masking routine. In other words, the asymmetric encryption is used to protect the input to the last masking process so that an adversary cannot determine what value was used.

Also, the use of three rounds means that the masking and encrypting routine does not need to know the internal structure of the input formatted block. This achieves the desirable property of independence from the structure of the formatted block, so that the encryption method does not place any a priori requirements on the formatted block, besides the essential requirement that it (somewhere) contain secret data that is infeasible to exhaust.

Also, three rounds of masking are preferred to doing four rounds as doing four rounds would take longer to process.

Each of generator functions G0 and G2 is a one-way function that calculates an n-bit output value from an m-bit input value; similarly, each of generator functions G1 and G3 is a one-way function that calculates an m-bit output value from an n-bit input value. As is conventional in cryptography, by "one-way" function is meant a function whose inverse is computationally infeasible to calculate for almost any output value of the function. Generator functions G0–G3 may be formed from standard cryptographic hash functions as described in copending application Ser. No. 08/603,771 and as is well known in the art generally.

In the embodiments shown, function G2 may be identical to function G0, while function G3 may be identical to function G1. This is merely for efficiency of implementation, however, and in general G2 and G3 may differ from G0 and G1. Also, functions G0 and G2 need differ from functions G1 and G3 only if parts A and B are of different lengths. If the two parts were of the same length, then all four functions G0–G3 may be identical.

Figure 6:
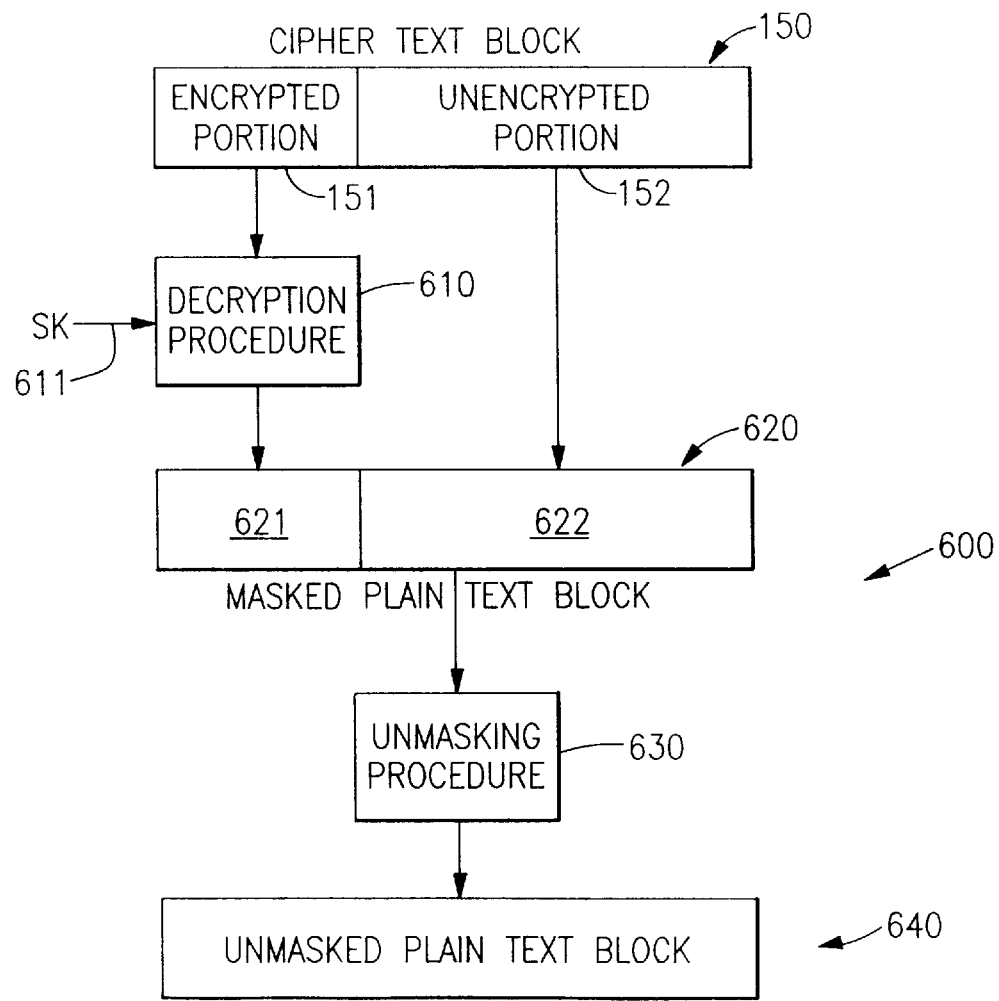
FIG. 6 is a schematic block diagram of the decryption procedure of the present invention.

FIG. 6 shows the procedure 600 used to recover the original key block from the ciphertext block 150. Procedure 600 decrypts the encrypted portion 151 of ciphertext block 150, using a decryption procedure 610, to generate the first portion 621 of a regenerated masked key block 620. Decryption procedure 610 is simply the inverse of encryption procedure 140. If encryption procedure 140 is a public key procedure having a public encryption key 141, decryption procedure 610 has a corresponding secret decryption key 611 known only to the recipient. If encryption procedure 140 is a symmetric procedure, decryption key 611 is the same as (secret) encryption key 141. The remaining portion 622 of regenerated masked key block 620 is simply taken from the remaining portion 152 of the ciphertext block 150, without alteration. An unmasking procedure 630 then transforms the regenerated masked key block 620 into an unmasked key block 640 that should match the original key block 110.

Figure 7:
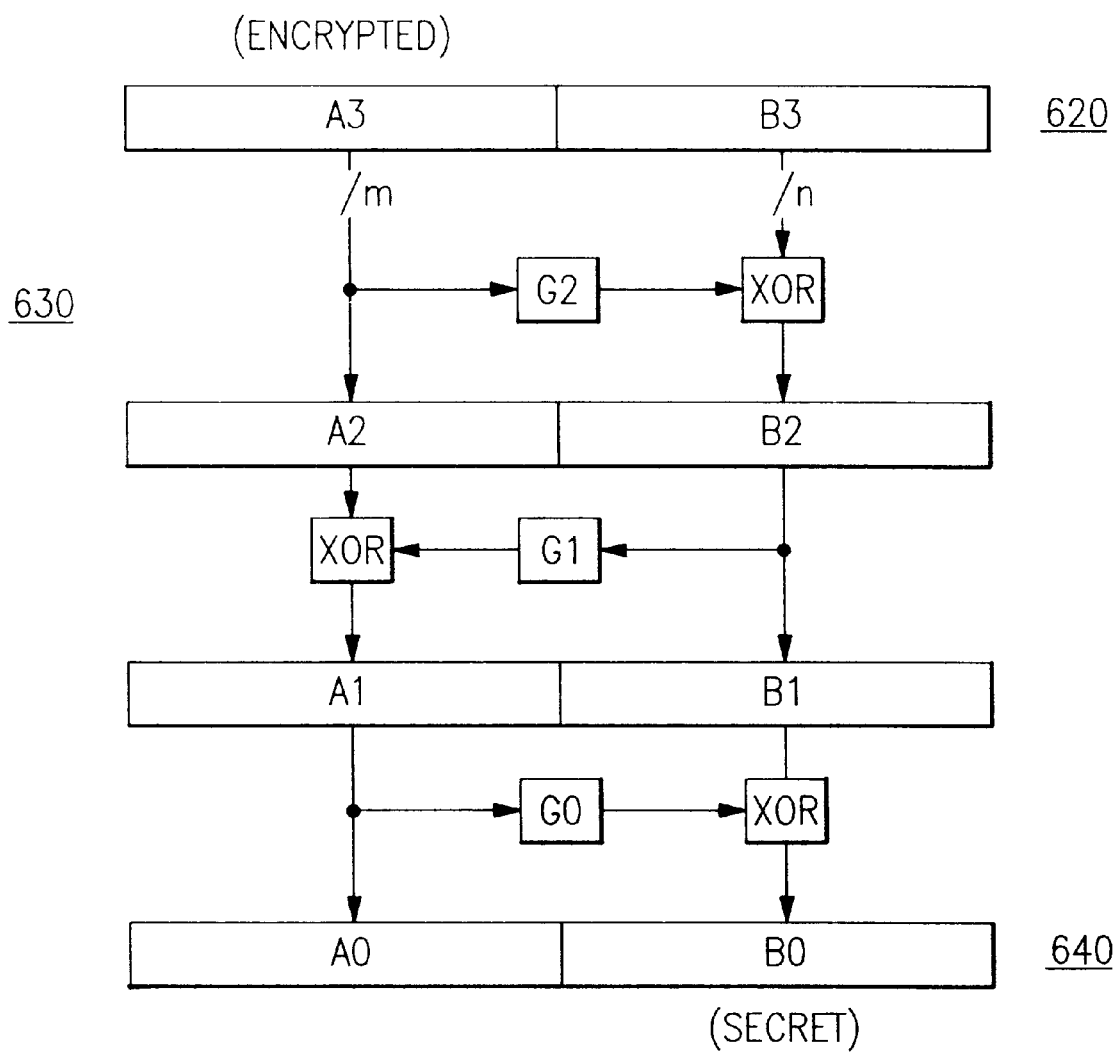
FIG. 7 is a schematic block diagram of the unmasking procedure corresponding to the masking procedure shown in FIG. 3.

The unmasking procedures 630 corresponding to the masking procedures 102a–120b shown in FIGS. 2–4 may be straightforwardly derived from the masking procedures by proceeding in the reverse direction, as described in copending application Ser. No. 08/603,771. Thus, FIG. 7 shows the unmasking procedure 630b corresponding to the three-round masking procedure 120b. The unmasking procedures corresponding to masking procedures 120a and 120c may be similarly derived.

There may be situations were one has data, such as control information, an initializing vector or a count, that one desires to associate or couple to the key but does not wish to keep in the key block itself. This can be accomplished by appending this data or a hash of this data to one of the parts into which the plaintext block is divided and calculating a mask value on the extended part, as described in copending application Ser. No. 08/603,771. Otherwise, the method is as described above.

As already noted, either key block 110 or the additional data field (or both) should be unique for each encryption of a plaintext block. This may be accomplished by inserting a unique count in the key block 110 or additional data field, or by using a time stamp, random number or other mechanism as described above and in copending application Ser. No. 08/603,771.

What is claimed is:

1. A method of encrypting an original plaintext data block using a block encryption procedure having a block size smaller than that of said original plaintext block, wherein said original plaintext block comprises first and second parts, said method comprising the steps of:
   transforming said original plaintext block into a masked plaintext block, said transforming step comprising the steps of:
      masking said second part with said first part to generate a once masked second part;
      masking said first part with said once masked second part to generate a once masked first part from which a first part of said masked plaintext block is generated; and
      masking said once masked second part with said once masked first part to generate a twice masked second part from which a second part of said masked plaintext block is generated;
   encrypting a subportion of said masked plaintext block having said block size and including at least a portion of said first part of said masked block using said encryption procedure to generate an encrypted portion of said masked plaintext block, said masked plaintext block having a remaining portion that is not part of said subportion; and
   generating a ciphertext block from said encrypted portion of said masked plaintext block and the remaining portion of said masked plaintext block.

2. The method of claim 1 in which said once masked first part forms said first part of said masked plaintext block and said twice masked second part forms said second part of said masked plaintext block.

3. The method of claim 1, comprising the further step of transmitting said ciphertext block to a recipient.

4. The method of claim 1 wherein said ciphertext block is generated without encrypting the remaining portion of said masked plaintext block.

5. The method of claim 1, comprising the further step of recovering the original plaintext block from said ciphertext block.

6. The method of claim 5 wherein said recovering step comprises the steps of:
   regenerating said masked plaintext block from said ciphertext block to provide a regenerated masked plaintext block, said regenerating step including the step of decrypting said encrypted portion of said masked plaintext block; and
   regenerating the original plaintext block from the regenerated masked plaintext block by inverting said predetermined transformation.

7. The method of claim 1 wherein said encryption procedure comprises an asymmetric encryption procedure having a public encryption key and a private decryption key.

8. The method of claim 1 in which said encryption procedure comprises an elliptic curve procedure.

9. The method of claim 1 wherein each of said masking steps comprises the steps of:
   generating a mask value from one of said parts using a predetermined transformation; and
   combining said mask value with another of said parts to generate a masked other part.

10. The method of claim 9 wherein said mask value is generated using a one-way function.

11. The method of claim 9 wherein said combining step is performed by combining blocks using modulo addition.

12. A program storage device readable by a machine, tangibly embodying a program of instructions executable by the machine to perform the method steps of claim 1.

13. Apparatus for encrypting an original plaintext data block using a block encryption procedure having a block size smaller than that of said original plaintext block, wherein said original plaintext block comprises first and second parts, said apparatus comprising:
   means for transforming said original plaintext block into a masked plaintext block, said transforming means comprising:
      means for masking said second part with said first part to generate a once masked second part;
      means for masking said first part with said once masked second part to generate a once masked first part from which a first part of said masked plaintext block is generated; and
      means for masking said once masked second part with said once masked first part to generate a twice masked second part from which a second part of said masked plaintext block is generated;
   means for encrypting a subportion of said masked plaintext block having said block size and including at least a portion of said first part of said masked block using said encryption procedure to generate an encrypted portion of said masked plaintext block, said masked plaintext block having a remaining portion that is not part of said subportion; and
   means for generating a ciphertext block from said encrypted portion of said masked plaintext block and the remaining portion of said masked plaintext block.

14. The apparatus of claim 13, further comprising:
   means for recovering the original plaintext block from said ciphertext block.

15. The apparatus of claim 14 wherein said recovering means comprises:
   means for regenerating said masked plaintext block from said ciphertext block to provide a regenerated masked plaintext block, said regenerating step including the step of decrypting said encrypted portion of said masked plaintext block; and means for regenerating the original plaintext block from the regenerated masked plaintext block by inverting said predetermined transformation.

16. The apparatus of claim 13 wherein each of said masking means comprises:

means for generating a mask value from one of said parts using a predetermined transformation; and means for combining said mask value with another of said parts to generate a masked other part.

17. A method of encrypting an original plaintext data block using a block encryption procedure having a block size smaller than that of said original plaintext block, wherein said original plaintext block comprises first and second parts, said second part containing secret data that is infeasible to exhaust, said method comprising the steps of:

transforming said original plaintext block into a masked plaintext block, said transforming step comprising the steps of:

masking said first part with said second part to generate a masked first part from which a first part of said masked plaintext block is generated; and masking said second part with said masked first part to generate a masked second part from which a second part of said masked plaintext block is generated;

encrypting a subportion of said masked plaintext block having said block size and including at least a portion of said first part of said masked block using said encryption procedure to generate an encrypted portion of said masked plaintext block, said masked plaintext block having a remaining portion that is not Dart of said subportion; and generating a ciphertext block from said encrypted portion of said masked plaintext block and the remaining portion of said masked plaintext block.

18. The method of claim 17 in which said once masked first part forms said first part of said masked plaintext block and said twice masked second part forms said second part of said masked plaintext block.

19. A program storage device readable by a machine, tangibly embodying a program of instructions executable by the machine to perform the method steps of claim 17.

20. Apparatus for encrypting an original plaintext data block using a block encryption procedure having a block size smaller than that of said original plaintext block, wherein said original plaintext block comprises first and second parts, said second part containing secret data that is infeasible to exhaust, said apparatus comprising:

means for transforming said original plaintext block into a masked plaintext block, said transforming means comprising:

means for masking said first part with said second part to generate a masked first part from which a first part of said masked plaintext block is generated; and means for masking said second part with said masked first part to generate a masked second part from which a second part of said masked plaintext block is generated;

means for encrypting a subportion of said masked plaintext block having said block size and including at least a portion of said first part of said masked block using said encryption procedure to generate an encrypted portion of said masked plaintext block, said masked plaintext block having a remaining portion that is not part of said subportion; and means for generating a ciphertext block from said encrypted portion of said masked plaintext block and the remaining portion of said masked plaintext block.

* * * * *

UNITED STATES PATENT AND TRADEMARK OFFICE
CERTIFICATE OF CORRECTION

PATENT NO. : 5,987,124

DATED : November 16, 1999

INVENTOR(S) : Matyas et al.

It is certified that error appears in the above-identified patent and that said Letters Patent are hereby corrected as shown below:

Column 11, line 33, "Dart" should be --part--.

Signed and Sealed this

Twenty-seventh Day of June, 2000

Attest:

Q. TODD DICKINSON

*Attesting Officer*    *Director of Patents and Trademarks*